United States Patent [19]

Cain et al.

[11] Patent Number: 4,621,366
[45] Date of Patent: Nov. 4, 1986

[54] MODEM EQUALIZER TRAINING USING PREVIOUSLY STORED PARAMETERS

[75] Inventors: Roger W. Cain; Norman R. Harris, both of Huntsville, Ala.

[73] Assignee: Universal Data Systems, Inc., Huntsville, Ala.

[21] Appl. No.: 582,453

[22] Filed: Feb. 22, 1984

[51] Int. Cl.[4] ........................ G06F 15/34; H04B 3/04
[52] U.S. Cl. ........................................ 375/8; 375/13; 375/106
[58] Field of Search ................. 333/18; 375/8, 11, 12, 375/13, 14, 97, 106; 370/17; 371/22; 340/825.06, 825.14, 825.15

[56] References Cited

U.S. PATENT DOCUMENTS

| | | | |
|---|---|---|---|
| 3,962,637 | 6/1976 | Motley et al. | 375/14 |
| 4,009,356 | 2/1977 | Borysiewicz et al. | 375/13 |
| 4,047,013 | 9/1977 | Milewski | 333/18 |
| 4,320,517 | 3/1982 | Godard et al. | 375/13 |
| 4,455,661 | 6/1984 | Qureshi | 375/8 |

Primary Examiner—Benedict V. Safourek
Attorney, Agent, or Firm—Weingarten, Schurgin, Gagnebin & Hayes

[57] ABSTRACT

A high-speed modem which acquires receiver operating parameters and equalizer coefficients, stores the parameters and coefficients after an initial modem communication having an initial training sequence, and reinitializes the modem equalizer and receiver at the beginning of subsequent modem transmissions with the previously stored coefficients and parameters to be followed by a shortened training sequence. The modem according to the present invention acquires the above-mentioned parameters and coefficients with improved accuracy by extending the initial training period before the transmission of data. The particular stored receiver parameters include carrier frequency offset and data timing frequency offset parameters. According to the present invention, an additional Δ parameter is determined and stored which optimizes the receiver timing according to a difference between parameters acquired at different portions of the initial training sequence. During subsequent modem transmissions and after restoration of several of the previously used equalizer coefficients and receiver parameters, the modem further acquires the remaining receiver parameters during a very brief training period. The parameters acquired during the brief training period are adjusted by the previously determined Δ parameter to achieve a high data accuracy with a minimum (brief) training period, which maximizes data transfer during the subsequent transmissions.

11 Claims, 3 Drawing Figures

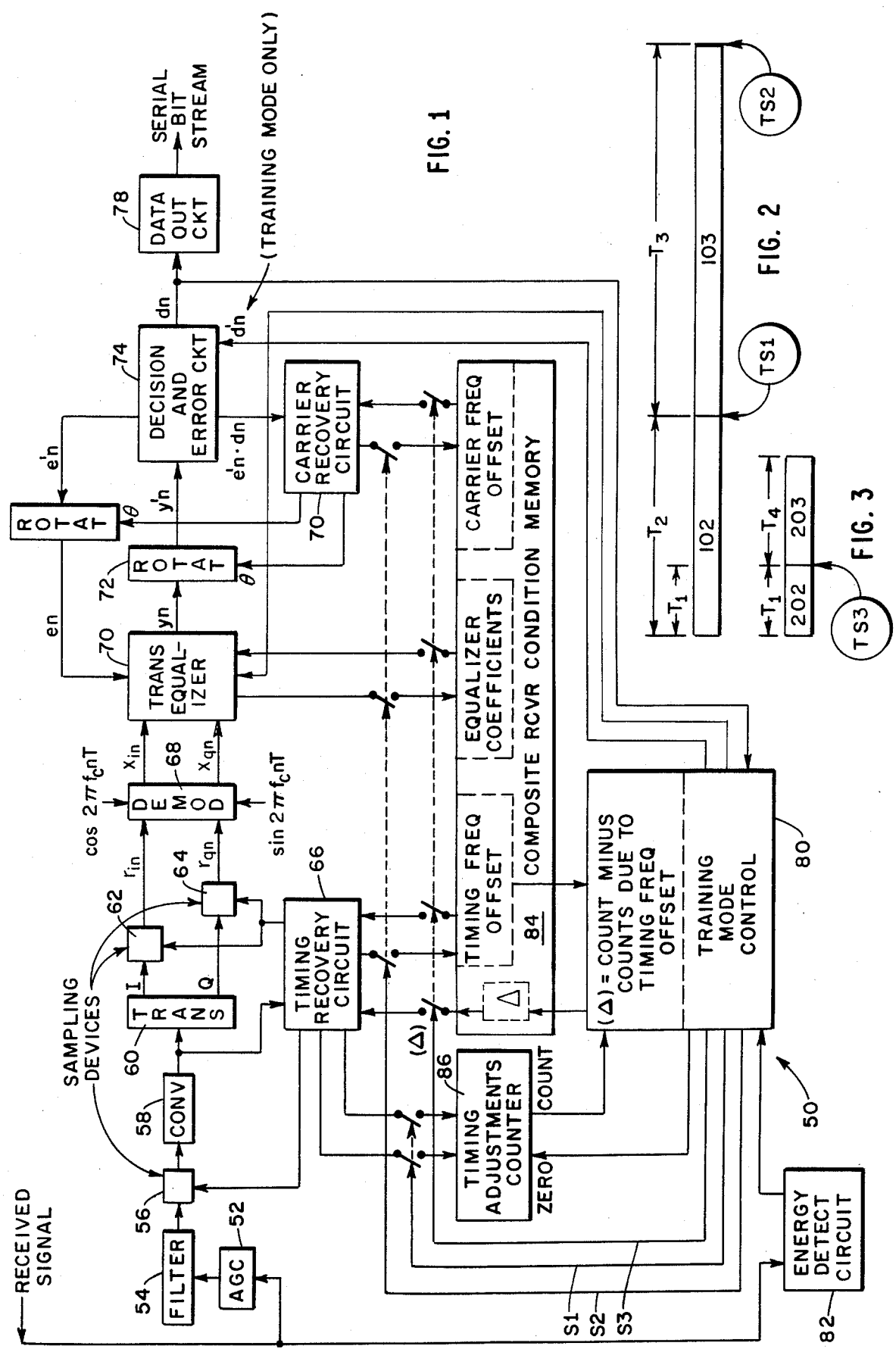

MODEM EQUALIZER TRAINING USING PREVIOUSLY STORED PARAMETERS

FIELD OF THE INVENTION

This invention relates to quadrature amplitude modulation (QAM) data transmission systems employing automatic adaptive equalizers, and in particular to a method and device within the data transmission systems for rapid equalizer start-up.

BACKGROUND OF THE INVENTION

In QAM data transmission systems, the sequence of data bits to be transmitted is first divided into groups of n bits, wherein each group corresponds to one of $2^n$ complex numbers or symbols. These symbols are then individually transmitted at T-second intervals, hereinafter called signalling instants. Each symbol is transmitted by causing a given amplitude of each of two carrier waves in quadrature relationship to correspond, respectively, to real and imaginary parts of the complex numbers. The two carrier waves are then combined and applied to the input of the transmission channel.

The transmission channel, connected to a data receiver, provides at its output a signal as similar as possible applied to the transmission channel input signal. However, the transmission channels most often used are telephone lines. The telephone lines, while satisfactory for voice transmission purposes, become less satisfactory when used as data transmission channels for high data speeds equal to or greater than 4800 bits per second (bps) for a particular probability of error in the received data. For high-speed data transmission, the received data is impaired by telephone line limitations. These impairments include amplitude and phase distortions which create an interaction between successive data signal, which make it difficult to correctly detect the transmitted data. This interaction is known as intersymbol interference.

In high-speed data transmission systems, the receiver generally includes an automatic adaptive equalizer to minimize the effects of the intersymbol interference before detection of the data. The type of adaptive equalizer that is the most widely used in those data transmission systems which employ QAM modulation is the complex transversal equalizer, an exemplary embodiment of which is described in U.S. Pat. No. 3,947,768. In such an equalizer, each of the in-phase and quadrature components of the received signal is applied to the inputs of a pair of transversal filters having selectable parameters whose output signals are then combined to generate the in-phase and quadrature components of the equalized signal. The coefficients of these filters, which are generally called coefficients of the equalizer, are automatically adjusted to meet a given performance criterion. Prior to the transmission of the data comprising the actual information to be transferred, it is necessary that the values of the coefficients be as close as possible to optimum values to minimize errors in receiving the data. To this end, provision is made for at least one initial training period during which, before transmitting any information data, a known training sequence of signals is transmitted to the receiver. The receiver compares the received training sequence with an identical, locally generated training sequence. Any differences or errors in the received signals are used by the receiver to optimize the coefficients of the equalizer.

In some receivers, the coefficients are then continuously adjusted during transmission of the data.

Moreover, in addition to the equalizer, a modem receiver carrier recovery circuit, AGC circuit, and clock recovery device must all be properly conditioned before the transmission of data begins. Accordingly, provision has been made for a turn-on period, which includes the initial training period. The turn-on sequence is generated by the other transmitter to condition all of the devices contained in the corresponding receiver, including the adaptive equalizer, discussed above. This turn-on sequence generally comprises a first training sequence of signals, also called a preamble, for properly conditioning the AGC circuit and synchronizing the carrier recovery device and the clock recovery device, and is followed by a second equalizer training signal sequence.

In data transmission systems which send many short messages over the same channel, such as half-duplex operations, the turn-on sequence for receiver training occupies a significant portion of the active communication channel time, slowing the transfer of data and reducing the effectiveness of the high-speed data transmission system. Previous efforts directed at minimizing the duration of the turn-on sequence include cyclic equalization schemes of Mueller and Spaulding ("Cyclic Equalization—A New Rapidly Converging Equalization Technique for Synchronous Data Communication," *Bell System Telephone Journal*, February 1975, pp. 370–406) which achieve turn-on times on the order of tens of milliseconds at significant cost in computational hardware. Other examples of cyclic equalization include U.S. Pat. No. 4,152,649 of Choquet, May 1, 1979; U.S. Pat. No. 4,089,061 of Milewski, May 9, 1978; and U.S. Pat. No. 4,047,013 of Milewski, Sept. 6, 1977. A considerably less powerful computational engine is required to accomplish equalizer training using older, gradient techniques such as the least-mean-squares (LMS) algorithm of Widrow and Hoff (WESCON Convention Record, IRE, 1960, Part 4, pp. 96–104), described in complex form by Proakis and Miller (*IEEE, Transactions on Information Theory*, Vol. IT-15, No. 4, 1969). Typical turn-on sequences for gradient training techniques include a preamble with strong spectral components at the band edges to allow rapid initial acquisition of receiver timing (clock recovery) relative to the signalling instants, followed by a pseudo-random signal for equalizer training. An example of such a turn-on sequence is the 253-millisecond sequence provided in the CCITT recommendation V.29.

The concept of holding digital filter tap coefficients from one call for use as starting coefficients for echo cancellation of successive calls is shown in U.S. Pat. No. 4,386,430 of Treiber, May 31, 1983.

In systems where the equalizer is adapted to receive signals at 1/T signals per second, wherein T is the signalling instant as mentioned above, the output data signals are provided by the receiver at times $nT+\tau$, where $n=0, 1, \ldots,$ and $\tau$ denotes a timing epoch. Qureshi et al., U.S. Pat. No. 4,004,236, Jan. 18, 1977, noted that $\tau$ is critical and should be optimized. However, Qureshi et al. use T/2 equalizer tap spacing to desensitize equalizer training to the exact value of the timing epoch $\tau$. This allows a shorter turn-on (fast-train) sequence by eliminating the timing recovery segment of the preamble preceding the pseudo-random signal for equalizer training at the expense of doubling the number of tap coefficients to be updated. However, the time thus saved is much less than the remaining time still required for equalizer training.

The strong dependence of 1/T spaced equalizers upon the timing epoch $\tau$ is well known. Typically, the value of $\tau$ is optimized by the clock recovery devices which seek to sample at the peak of the envelope of the received signal, thus maximizing the energy of the received signal when sampled at 1/T Hz. The sampling signal is provided by clock recovery devices in the receiver. An example of such a clock recovery device is described by Godard in "Passband Timing Recovery in an All-Digital Modem Receiver" (*IEEE, Transactions on Communications,* Vol. Com-26, No. 5, May 1978) and U.S. Pat. No. 4,039,748 of Caron et al., Aug. 2, 1977. The optimum value of $\tau$, according to Godard, is selected during a typical preamble, such as the preamble (segment 2) of the CCITT V.29 turn-on sequence. However, the value of $\tau$ selected during a typical preamble (with alternating signals) is different from the optimum value of $\tau$ determined during the subsequent pseudo-random training sequence period, due to differences in frequency content of the respective training sequence periods. If the initial timing epoch $\tau$ (acquired from an alternating data pattern) is imposed upon a receiver operating with equalizer coefficients trained at a later (revised) timing epoch $\tau'$ acquired from a subsequent pseudo-random data pattern, the equalizer will fail to completely equalize for intersymbol interference resulting from phone line limitations. The improperly equalized receiver will then operate at an elevated error rate for some period of time until the equalizer can eventually adapt to the new timing epoch. Notwithstanding the recognized critical nature of $\tau$ with respect to the selection of the equalizer coefficients, no significance has previously been placed on the differences in determination of $\tau$, nor has there been an accommodation of that difference to allow further modem improvement.

BRIEF DESCRIPTION OF THE INVENTION

The modem of the present invention provides a method and device for training the equalizer of a QAM receiver such that after an initial training sequence and an initial data transfer have taken place, a very short subsequent turn-on sequence may be used for successive data transmissions. During the initial training sequence, equalizer parameters and several receiver parameters, including a timing epoch difference parameter $\Delta$ which corresponds to the difference between the different values determined for the timing epochs $\tau$ and $\tau'$, are accurately acquired and stored for use in the succeeding data transmissions.

The amount of difference or adjustment $\Delta$ is a function of the transmission line characteristics, and may vary over the range of dial-up telephone lines. According to the present invention, which includes an equalizer having taps spaced at T sampling instants, the determination of the difference $\Delta$ is critical to the success of training for that equalizer.

In accordance with the method of the present invention, equalizer coefficients, timing frequency offset, carrier frequency offset, and timing epoch difference $\Delta$ parameters, discussed below, are all stored during an initial data transfer which includes an initial training sequence. Subsequently, when the data channel is again used, the receiver and equalizer parameters and timing epoch difference $\Delta$, are restored, and a short turn-on sequence is used to again recover an initial timing epoch $\tau$ (during a preamble) which is added to difference $\Delta$ to provide the revised epoch $\tau'$. The carrier phase parameter for the modem receiver is also recovered during the remainder of the short-train period in advance of the ensuing data transmission.

More specifically, the invention provides for the use of an extended initial training sequence which comprises a preamble with strong spectral components at the band edges, during which $\tau$ is acquired, followed by a psuedo-random signal of length sufficient for equalizer training by gradient methods to determine a revised epoch $\tau'$. The initial train preamble is sufficiently long to completely acquire the timing frequency offset, so that the revised timing epoch $\tau$ can be simply and accurately measured (as discussed below) during the pseudo-random signal period. On subsequent communications, the epoch $\tau$ is again acquired and the revised $\tau'$ is then restored by adding $\Delta$ to the epoch $\tau$. Since the equalizer coefficients are initially selected for a timing epoch adjusted by difference $\Delta$, the receiver is rapidly optimized after the subsequent short-train periods. As a result, the invention allows the use of a significantly shortened turn-on sequence in subsequent data transfers providing low error rates, minimal added hardware, and substantial savings of time required for receiver adjustment.

BRIEF DESCRIPTION OF THE DRAWINGS

These and other features of the present invention will be better understood by reading the following detailed description, taken together with the drawing, wherein:

FIG. 1 is a block diagram of a QAM receiver incorporating the invention;

FIG. 2 is a timing diagram of the initial training sequence; and

FIG. 3 is a timing diagram of the short turn-on sequence.

DETAILED DESCRIPTION OF THE INVENTION

A 9600-bps QAM 1200-baud receiver 50 according the invention is shown in FIG. 1. The particular embodiment shown generally conforms to CCITT Recommendation V.29.

The general operation, excluding operation with respect to $\tau$ and $\Delta$ are described as follows. The signal received from the transmission channel, such as a telephone line (not shown), is amplitude-normalized by an automatic gain control (AGC) circuit 52, and filtered by a bandpass filter 54, which rejects the out-of-band noise. The resulting signal is received by a sampling device 56 which provides signal samples at the rate 1/s per second. The rate 1/s is selected to equal a multiple m/T (where m=4 in this embodiment) of the signalling instants (baud rate) 1/T so as to provide a number of signal samples at the output of the sampling device 56 to enable the sequence of signal samples to sufficiently describe the received signal (which when detected is represented by $d_n$) for the subsequent processing, described below. The amplitude of these signal samples, converted to digital form by an analog-to-digital converter 58 is then received by a digital Hilbert transformer 60.

The Hilbert transformer 60 is generally known as a device which has one signal input and two quadrature signal outputs, providing at its outputs the in-phase and quadrature components, respectively, of the input signal. An exemplary digital embodiment of such a device is described in an article entitled "Theory and Implementation of the Discrete Hilbert Transform," by L. R. Rabiner and C. M. Rader, in *Digital Signal Processing*, IEEE Press, 1972, incorporated by reference.

The in-phase (I) and quadrature (Q) output signal from the Hilbert transformer 60 are respectively resampled at the signalling rate 1/T by I and Q sampling devices 62 and 64, respectively. A clock recovery device 66 is connected to receive the output signal of the analog-to-digital converter (ADC) 58 and to control the sampling device 56, the I and Q sampling devices 62 and 64, and other components (not shown) of the receiver 50. The individual above-mentioned sampling devices, ADC, AGC, and clock recovery device as known in the art are used, and the details of the embodiments of the individual devices are not discussed here.

The digitized I and Q signal components, respectively provided at the outputs of the sampling devices 62 and 64 of the received signal, are applied to the signal inputs of a complex demodulator 68. The complex demodulator 68 receives from a local source (not shown) an in-phase carrier of the form cos $2\pi f_c$NT and a quadrature carrier of the form sin $2\pi f_c$nT, where $f_c$ is the carrier frequency and n is a positive integer the value of which ranges from zero to infinity. If the signal is received at the signalling instant nT, designated $r_n$, the I and Q components, at the outputs of the sampling devices 62 and 64, are expressed as $r_{i,n}$ and $r_{q,n}$, respectively. The demodulator 68 then provides sampled I and Q components $x_{in}$ and $x_{qn}$, respectively, of the demodulated signal $x_n$, in accordance with the wellknown relations:

$$x_{in} = r_{i,n} \cos w_c t + r_{q,n} \sin w_c t \quad (1)$$

$$x_{qn} = -r_{i,n} \sin w_c t + r_{q,n} \cos w_c t \quad (2)$$

The two resulting digital numbers $x_{in}$ and $x_{qn}$ are regarded as the real and imaginary parts of a complex signal value $$x_n = x_{in} + jx_{qn}, \text{ where } j = \sqrt{-1}, n = 0,1,2, \ldots \quad (3)$$

The complex numbers $x_n$ then pass through a complex equalizer 70, which includes a tapped delay line, generally known in the art. The delay line signals received from N taps are weighted and summed to produce a signal according to complex arithmetic which includes the formula $$y_n = \sum_{k=0}^{N-1} C_k X_{n-k} = y_{in} + jy_{qn} \quad (4)$$

where $C_k$ represents the N tap weighting coefficients which are digital complex numbers that are stored in the equalizer and characterize the equalizer 70.

The resulting complex equalizer 70 output signal $y_n$, which includes in-phase, $y_{in}$, and quadrature, $y_{qn}$, components, is then adjusted by circuit 72 for the phase difference $\theta$, between the local clock, $f_c$, and the received carrier fruquency based on the output, $\theta$, of the carrier recovery circuit according to the known relation:

$$\left. \begin{array}{l} y_{in}' = y_{in}\cos\theta + y\sin\theta \\ y_{qn}' = -y_{in}\sin\theta + y_2\cos\theta \end{array} \right\} y_n' = y_{in}' + jy_{qn}' \quad (5)$$

which provides rotation of complex signal $y_n$ through the angle $\theta$ to produce the phase-locked complex equalizer output signal $y'_n$. Finally, the equalized and rotated output signal $y'_n$ is entered into a decision-and-error circuit 74, which has two modes of operation. In data mode, the decision-and-error circuit 74 determines which complex data signal $d_n$ was sent by the remote transmitter (not shown), and then computes the corresponding complex apparent error signal:

$$e'_n = y'_n - d_n \quad (6)$$

During training mode (initial adjustment of the equalizer), the transmitter sends known, predetermined data signals in an initial training sequence before the data, which are also simultaneously generated with the receiver by a training mode control circuit 80 as signals $d_t$, where $d_t = d_n$ in Equation 6. The error signal $e'_n$ is computed and then used to adjust carrier recovery circuit 76 and to adjust the equalizer 70 tap coefficients $c_k$. The complex signals $d_n$ corresponding to the transmitted data, and are subsequently converted to a serial bit stream in a data out circuit 78 for delivery to the user.

The initial adjustment of the receiver 50, particularly with regard to the present invention including epoch $\tau$ and difference $\Delta$ is described as follows: A remote transmitter (not shown) sends a very simple first segment of the signal preamble 102 having strong spectral components at the band edges of the transmitted spectrum. The AGC circuit 52 is initially put into a fast attack, high-gain mode and quickly establishes the proper signal lever within the receiver 50. The receiver 50 carrier recovery circuit 76 detects the appearance of received signal energy and causes the receiver 50 to start its initialization and training procedure with a start-up sequence discussed with respect to FIG. 2. The timing recovery circuit 66 uses the strong band-edge spectral components to make an initial determination of a best sample timing epoch, $\tau$. The carrier recovery circuit 76 may also initialize the carrier phase and frequency at this time, although it is not necessarily required in a QAM system with a complex equalizer since the complex equalizer itself is capable of acquiring the carrier phase. According to the normal sequence of signals in the initial training sequence, the remote transmitter then changes to a pseudo-random training pattern 103, FIG. 2, used to train the equalizer. The sample timing epoch $\tau$ is revised during the pseudo-random sequence to provide a new sample timing epoch $\tau'$ to which the equalizer coefficients are uniquely matched, the difference being a value $\Delta$:

$$\Delta = \tau' - \tau \quad (7)$$

The revised sample timing epoch $\tau'$ provides a basis on which to determine the effective sampled-data frequency response of the channel, for which the equalizer has been trained to equalize. The resulting trained set of optimized equalizer coefficients extant at the end of the pseudo-random sequence is uniquely matched to the revised sampling epoch $\tau'$. According to the present invention, this unique matching of revised timing epoch $\tau'$ and equalizer coefficients is preserved in memory 84 by calculation and storage of difference $\Delta$ to allow a shorter turn-on sequence, called "short train," for subsequent data transmissions on the same transmission circuit.

Moreover, derivative terms of higher-than-first-order phase-locked loops such as the timing and carrier recovery loops of timing recovery circuit 66 and carrier recovery circuit 70 of the particular receiver 50 embodiment, typically require many symbol periods during the initial training sequence to be accurately acquired. The details of the phase-locked loops are not critical to the use of $\Delta$ in the present invention, and such details are not included herein. The derivative terms are also saved in memory during the initial training sequence and restored in the short-train sequence to reduce or eliminate the time to reacquire them. Therefore, in the preferred embodiment, receiver timing frequency offset and carrier frequency offset, together with equalizer coefficient and an epoch difference $\Delta$ acquired at the end of an initial train, are stored in memory 84 to be used to recompute the revised timing epoch $\tau'$ (after acquiring $\tau$ during the beginning of subsequent short-train sequences). The stored data is then restored at the beginning of a short turn-on sequence.

A timing diagram of the initial training sequence according to this invention is shown in FIG. 2. Period 102 represents the preamble having strong spectral components at the band edges to allow rapid acquisition of the timing epoch $\tau$ during period $T_1$, and to allow acquisition timing frequency offset, and carrier frequency offset signal data. In the preferred embodiment, the duration of time $T_1$ is limited to the shortest time possible in which to repeatably acquire timing epoch $\tau$ by the timing recovery circuit to within $\pm 2\%$ of the symbol interval T. The total duration time $T_2$ of period 102, typically two seconds, is a time sufficient for complete acquisition of timing frequency offset. Also, the carrier frequency offset may be acquired during period 102. Period 103, typically one second, represents the pseudo-random sequence for equalizer training and carrier phase acquisition. At the conclusion of period 103, the timing epoch $\tau$ has been revised to $\tau'$, and according to Equation 7, the difference $\Delta$ is determined and stored.

The training mode control 80 counts the data symbol times after receiving a signal generated by energy detect circuit 82 in response to the incoming initial signal. When sufficient data symbol times have occurred and time $T_2$ has elapsed, an event TS1 occurs by the training mode control wherein the timing adjustment counter 86 is reset to zero, and the sampling period T is allowed to incrementally change according to the timing recovery circuit 66 which increments or decrements the timing adjustments counter 86. The training mode control holds the S1 control closed throughout period 103. When the timing recovery circuit evokes an incremental increase response in the sampling period T, the timing adjustments counter counts up. When the timing recovery circuit evokes an incremental decrease response in the sampling period, the timing adjustments counter counts down.

For a given timing frequency offset condition acquired during period 102, the timing recovery circuit 66 will command a fixed number of adjustments in compensation for timing frequency offset alone during period 103. Any other adjustments are attributable to a revised (optimized) timing epoch $\tau'$ during period 103. On expiration of time T3, sufficient for training of the adaptive equalizer (and acquired carrier phase) the training mode control evokes event TS2 to store equalizer coefficients, carrier frequency offset, and timing frequency offset into the composite receiver condition memory. The training mode control 80 then converts the timing frequency offset signal data into an equivalent number of timing adjustment increments over a duration T3 and modifies the count output of a timing adjustments counter 86 to determine the number of timing adjustment increments, which comprise the timing epoch difference $\Delta$. The difference $\Delta$ is then stored in composite receiver memory 84 for use in the short-train start-up. Period 102 must be sufficiently long (typically two seconds) to acquire timing frequency offset, so that the conversion to an equivalent number of timing adjustment increments would have enough resolution to allow an accurate calculation of difference $\Delta$.

According to this invention, subsequent data transmissions include a short train sequence, shown in FIG. 3, which begins with period 202 comprising an alternating data sequence having strong band edge components which is identical to the signal of period 102 (initial train preamble), but shorter in duration. During period 202, initial acquisition of a timing epoch $\tau$ is completed in a fashion identical to that employed during the initial duration $T_1$ of the initial train period 102. After activation of the carrier detect circuit by the incoming signal and elapse of time $T_1$, the train controller operates control S3 to evoke event TS3. Thereafter, equalizer coefficients, carrer frequency offset, and timing frequency are reloaded into the receiver from the parameters previously stored in the composite receiver memory 84. The value of $\Delta$ for timing adjustment increments is also applied to $\tau$ of the timing recovery circuit, providing the revised timing epoch $\tau'$. At this time (TS3), all receiver parameters necessary to data mode operations are in effect with the sole exception of carrier phase. Accordingly, period 203 concludes the short turn-on sequence with the purpose of allowing acquisition of carrier phase. In the preferred embodiment, period 203 comprises pure carrier to enable phase acquisition in the minimum possible time, $T_4$. During period 203, equalizer coefficient values are frozen by the training mode control 80. The training mode control 80 also supplies training mode signals $d_t$ to the decision-and-error circuit 74 which correspond to pure carrier, enabling normal operation of the carrier recovery circuit to acquire phase. Preferably, the adjustments to timing epoch $\tau'$ by the timing recovery circuit should be inhibited during period 203. However, in practice, the duration of time $T_4$ is so short that the misadjustment of $\tau'$ during period 203 is insignificant. In the periods which follow, valid data mode signals refine the setting of timing epoch $\tau'$ by the timing recovery circuit. After period 203 and the short start-up sequence are complete, the data transmission commences according to the present invention, wherein the modem receiver 50 is fully and accurately operable as provided after the initial start-up sequence.

These and other implementations, including the substitutions and modifications of various system elements made by one skilled in the art, are within the scope of the present invention, which is not to be limited except by the claims which follow.

What is claimed is:

1. A method of equalized modem training between at least two modems comprising the steps of:
   receiving a long train sequence of training signals having strong spectral components at the band edges of the transmission spectrum and a subsequent pseudorandom sequence;
   acquiring a first set of modem parameters including a timing difference parameter for the difference between the optimum timing of said strong spectral components and said pseudorandom sequence
storing at least one of said modem parameters in a memory;
transferring a block of data between said modems;
terminating the transmissions;
reinitiating the transmissions;
receiving a short sequence of training signals;
acquiring subsequent receiver parameters including a short train timing parameter;
reloading at least one of said stored modem parameters from said memory;
adding said timing difference parameter to said short train timing parameter; and
transferring a subsequent block of data.

2. In a modem receiving a training sequence, a method of modem adjustment comprising the steps of:
receiving a first segment having strong spectral components at the band edges of the transmission spectrum;
acquiring a preliminary data timing parameter therefrom;
receiving a second segment having a pseudorandom sequence;
adjusting the preliminary data timing to provide a final data timing parameter according to the received pseudorandom sequence;
detecting a data timing difference parameter according to the difference between said preliminary and final data timing parameter;
transferring data;
storing the data timing difference parameter;
terminating the data transfer;
providing a training sequence to reorganize said preliminary data timing parameter;
combining the stored data timing difference parameter and said preliminary data timing parameter to restore said final timing parameter; and
transferring subsequent data.

3. The method of claim 2, wherein the first segment comprises a pattern of alternating signals, and the second segment comprises an equalizer conditioning pattern.

4. A communications system including a communication channel and a plurality of corresponding modems wherein one of said modem includes;
means for selectively transmitting a long training sequence, a short training sequence, and data signals on said communication channel; wherein the corresponding modem includes:
means for receiving said transmitted signals from said communication channel, including:
means for equalizing the received signal from said communication channel, having selectable equalizer coefficients;
means for detecting a long train sequence from the received signal;
means for detecting the timing from the received signal;
means for acquiring modem parameter values during said long train sequence from said means for equalizing and said means for detecting the timing, including a revised timing epoch value acquired at the end of said long train sequence;
means for storing said parameter values from said means for acquiring, including the equalizer coefficients selected according to said timing epoch;
means for receiving a block of data thereafter from the received signal;
means for detecting a short train sequence from the received signal;
means for restoring said revised timing epoch from the received signal and said means for storing;
means for restoring said equalizer coefficients from said means for storing; and
means for receiving data from the received signal after the parameters are restored.

5. For use in a data communication system having a training signal sequence preceding the transmission of data, a modem comprising:
means for establishing a channel and receiving a signal;
means for detecting a training sequence on said channel, said training sequence having predetermined training signals of at least two distinct segments;
means for acquiring receiver parameters on said channel according to said detected training sequence including a timing signal derived from at least two of said distinct segments;
means for storing said receiver parameters from said means for acquiring receiver parameters;
means for restoring said receiver equalizer and timing parameters from said means for storing after said means for detecting indicates a subsequent training sequence, wherein a subsequent training sequence is shorter than the initial timing sequence, and said receiver parameters being fully restored after said subsequent training sequence;
means for measuring an initial timing parameter;
means for measuring a revised timing parameter; and
means for determining the difference between said timing and revised parameter, wherein said difference parameter is stored in said means for storing.

6. The modem of claim 5, further including
means for equalizing the received signal according to said training sequence.

7. The modem of claim 6, wherein said means for restoring includes
means for adding the initial timing parameter to said stored difference parameter to provide a revised timing parameter.

8. The modem of claim 7, further including
channel equalizer means for improving the quality of said channel, having parameters selected according to said revised timing parameter.

9. The modem of claim 8, wherein said receiver parameters further include said equalizer coefficients.

10. The modem of claim 7, wherein
said training sequence comprises a first and a second part,
said means to acquire provides said initial timing offset parameters during the first part, and adjusts said initial timing offset parameter to form said revised timing offset parameter at the end of said second part.

11. The modem of claim 5, wherein said receiver parameters include:
a timing frequency offset parameter; and
a carrier frequency offset parameter.

* * * * *